United States Patent [19]
Sieren et al.

[11] 3,806,183
[45] Apr. 23, 1974

[54] SHIELDED STORAGE COMPARTMENT FOR VAN-TYPE VEHICLES

[75] Inventors: Michael P. Sieren, Racine; Arthur O. Radke, Milwaukee, both of Wis.

[73] Assignee: Universal Oil Products Company, Des Plaines, Ill.

[22] Filed: Nov. 24, 1972

[21] Appl. No.: 309,537

[52] U.S. Cl. ................................ 296/24 R, 296/66
[51] Int. Cl. .............................................. B60r 5/04
[58] Field of Search ........... 296/24 R, 23 R, 66, 1 R

[56] References Cited
UNITED STATES PATENTS
3,393,936   7/1968   Hall................................ 296/24 R Primary Examiner—Philip Goodman
Attorney, Agent, or Firm—James R. Hoatson, Jr.; Barry L. Clark; William H. Page, II

[57] ABSTRACT

Rear storage compartment for a van-type vehicle having windows in its rear doors has top, front and side portions which form a compartment which is ordinarily inaccessible to persons in the interior of the vehicle but is fully accessible from the exterior of the vehicle when the rear doors are open. Shield members mounted on the inside surface of the rear doors extend upwardly and inwardly to cover the lower portions of the windows and cooperate with the top portion of the storage compartment to prevent the contents of the compartment from being viewed from the exterior of the vehicle while permitting occupants of the vehicle to see out of the upper portions of the windows. Individual storage sections on each side of the main compartment, and open thereto, are adapted to receive hanging clothes. The latter sections are also accessible from the interior of the vehicle through access openings which are selectively covered by lockable sliding doors. The main compartment is accessible from the interior of the vehicle when the back cushion of a seat mounted in front of the compartment is removed. Both the seat back cushion and the sliding access doors may be locked from within the rear storage compartment to prevent unauthorized access by persons inside the vehicle.

7 Claims, 4 Drawing Figures

SHIELDED STORAGE COMPARTMENT FOR VAN-TYPE VEHICLES

BACKGROUND OF THE INVENTION

This invention relates to storage compartments for vehicles and especially to a storage compartment for a van-type vehicle having windows in its rear doors. Although van-type vehicles which have windows on all four sides offer the advantage of good visability for persons seated therein, the windows present a considerable problem in that they permit persons outside the vehicle to view the contents therein. It has been proven that packages stored in the closed trunk compartments of automobiles are less likely to be stolen than packages placed in stationwagons wherein the packages are readily visible, even though each type of vehicle can be locked to the same extent. Although recent models of stationwagons have incorporated a sealed storage compartment under the floor, these compartments offer extremely little covered storage space. Van-type vehicles may of course be closed to prying eyes by placing curtains on the windows but closed curtains result in a loss of visibility to the occupants of the vehicle. If curtains are left open during travel, the occupants must close them each time they leave the vehicle. Furthermore, curtains over the rear windows of the vehicle would not prevent someone at the front of the vehicle from viewing the contents thereof. Additionally, it is often necessary to park the vehicle in a public garage wherein the garage attendant has access to the interior of the vehicle which may contain valuable items. Customarily, the garage is unwilling to assume responsibility for the theft of articles from a vehicle. Thus, the vehicle owner must either assume a substantial risk every time he parks his vehicle containing valuables or else he must spend time searching for a garage or parking lot which will allow him to park and lock his vehicle himself, usually at additional expense.

SUMMARY OF THE INVENTION

It is an object of this invention to provide a shielded rear storage compartment for a van-type vehicle having windows in its rear doors which will provide a very large volume of cargo space which is shielded from the view of persons located either in the vehicle or outside of it.

It is another object of the invention to provide a storage compartment for a van-type vehicle which is fully accessible when the rear doors are opened.

It is an additional object of the invention to provide a rear storage compartment for a van-type vehicle which is capable of having clothes hung on racks therein by a person standing outside of the rear of the vehicle but which permits selective access to such clothing by occupants of the vehicle when desired.

These and other objects are attained by the storage compartment of the invention which broadly comprises a unit which is defined by side, front and top walls and a shield member attached to the inside of the vehicle's rear doors. The shield member cooperates with the top wall of the storage compartment when the rear vehicle doors are closed to prevent an outsider from looking into the compartment while simultaneously permitting occupants of the vehicle to look over the top of the storage compartment and out of the window. The storage compartment preferably includes separate sections on each side of the vehicle into which clothes may be hung on hangers. The upper forward walls of these side sections are accessible to the inside of the vehicle by means of sliding tambour doors which may be locked from the rear compartment when access from the inside of the vehicle is undesired. The front wall of the storage compartment consists mainly of the rear seat cushion of a seat assembly attached to the front wall of the compartment. The seat back can be moved to permit access to the compartment from the forward portion of the vehicle. However, locking means are provided in the rear compartment to prevent unauthorized removal of the seat cushion by occupants of the vehicle.

DESCRIPTION OF THE PREFERRED EMBODIMENT

Figure 1:
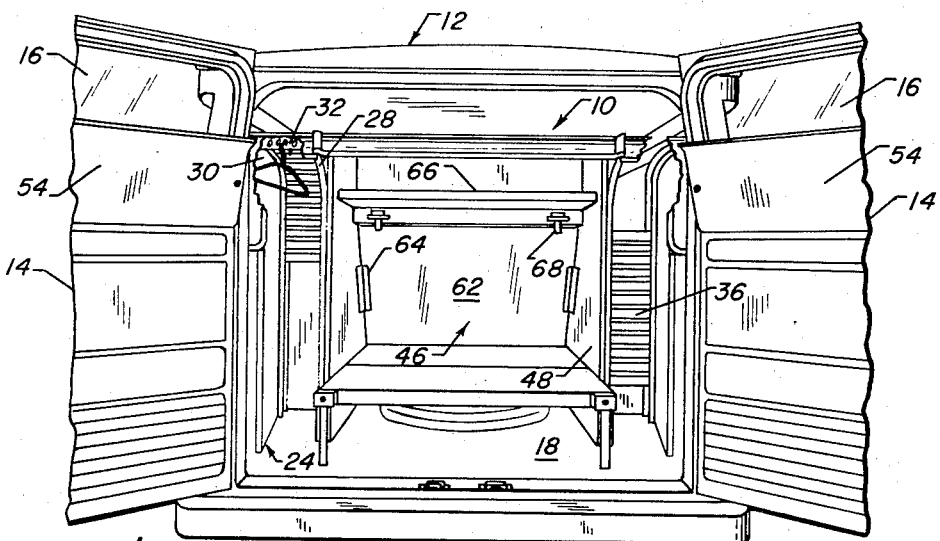
FIG. 1 is a perspective view of the rear of a vehicle showing the shielded storage compartment.

Referring to FIG. 1, a seating and storage unit indicated generally at 10 is mounted in the rear of a van-type vehicle 12 having rear doors 14, rear windows 16 in the doors, a floor 18 and side windows 20. The seating and storage unit 10 includes a pair of side storage units indicated generally at 24 which are mounted by fastening means (not shown) to the walls and the floor of the vehicle in a rather permanent manner. The side storage units 24 include cabinets 26 which are accessible from the interior of the vehicle. Each side unit 24 includes an inner vertical wall member 28 and an outer vertical wall member 30. The inner and outer wall members 28, 30 are connected together at the top of the unit by a hanger support member 32 which is fastened to the vertical walls at its ends and includes apertures along its length which are adapted to receive clothes hangers 34. The upper front and top portions of the storage units 24 are open to the interior of the vehicle when sliding tambour doors 36 are moved to their lower positions by pulling down on their handles 38. A locking member 40 on the sliding door 36 and a movable locking member 42 on the hanger support member 32 cooperate to permit the doors 36 to be locked from the rear of the vehicle in order to prevent access from the interior of the vehicle when desired.

Positioned between the side storage units 24, and attached to their inner vertical walls 28, is a main storage compartment indicated generally at 46 which includes vertical side wall members 48 and a top portion 50 having a rear lip portion 52. A shield member 54 formed of metal or plastic and having a forwardly extending lip portion 56 is mounted on the rear doors 14 by fastening means (not shown). When the doors are closed, the lip 56 on the shield member will cooperate with the lip portion 52 on the storage compartment 46 to prevent persons outside of the vehicle from viewing the contents of the storage compartment. Since neither the shield member 54 or the top portion 50 of the storage compartment extend as high as the top of the rear windows 16, persons inside the vehicle have a limited degree of visibility out of the rear of the vehicle.

The storage compartment 46 is closed in at its forward portion by a front wall member 58 which carries headrest cushion member 60 and is attached to side wall members 48. The front wall members 58 and the side walls 48 of the main compartment and the side walls 28, 30 of the side storage sections are preferably made of plywood or flake board. The top portion 50 of the storage compartment 46 carries no loading and may be made of relatively thin plastic. The front portion of the storage compartment 46 is selectively closed off by a seat-back cushion member 62 which rest against support members 64 fastened to the side walls 48. The seat-back cushion 62 is locked to a rear shelf member 66 by locking pins 68 accessible from the rear of the vehicle. The rear shelf member 66 is preferably made of metal and is fastened to the side walls 48 by by screws 70. A seat cushion 72 normally rests on base frame member 74 to which it is hinged by hinge 76 for movement a forward storage position as shown in dotted lines in FIG. 2. When the seat cushion 72 is in its forward position, the seat-back cushion 62 may be removed if desired to provide an extended length storage platform which may be used to store long article or to support a mattress and bedding for sleeping purposes.

Figure 2:
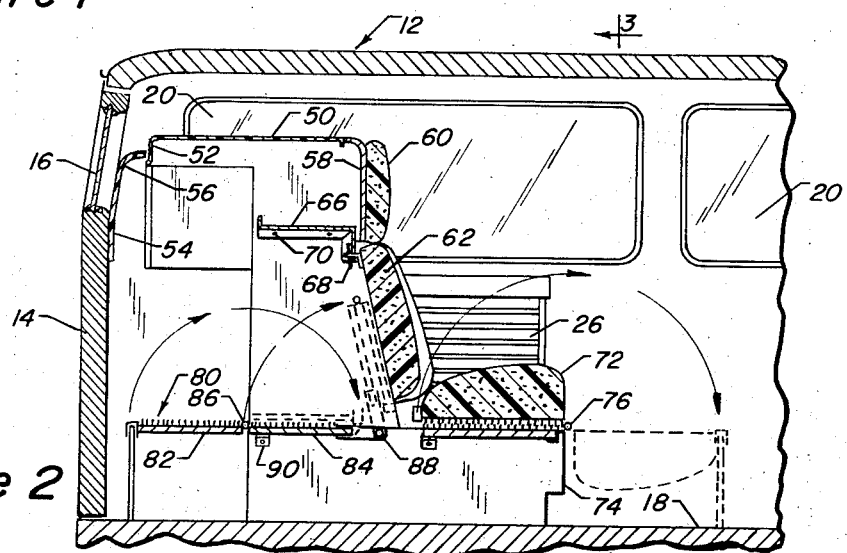
FIG. 2 is a side sectional view taken on line 2—2 of FIG. 3 showing the storage compartment with the vehicle doors closed.
Figure 3:
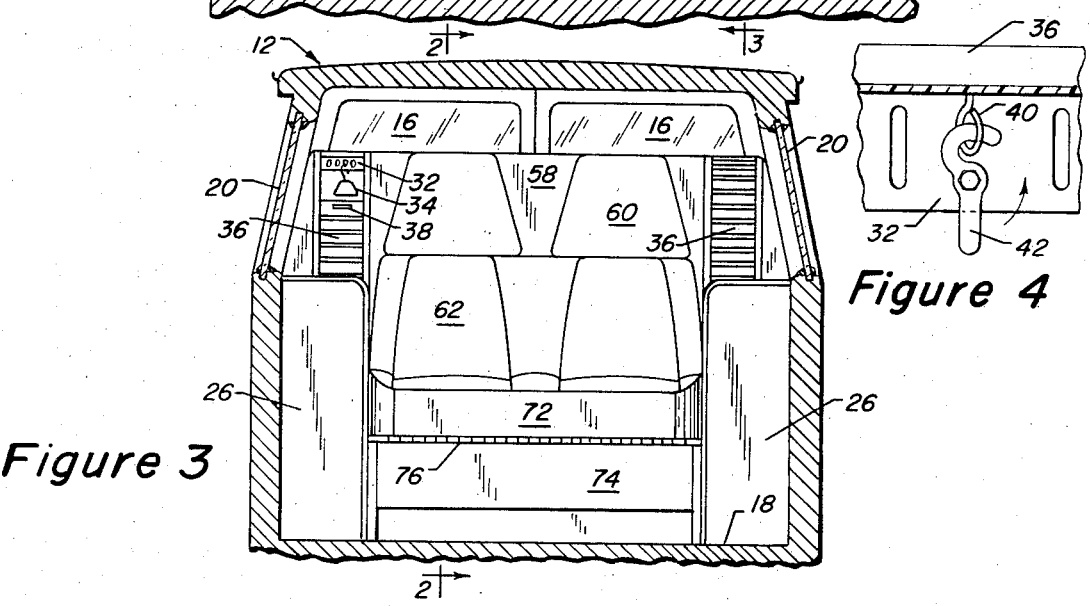
FIG. 3 is a front sectional view taken on line 3—3 of FIG. 2.
Figure 4:
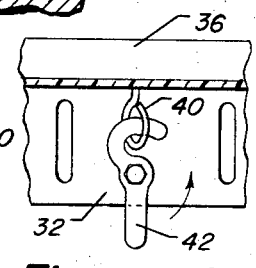
FIG. 4 is an enlarged view of the sliding door locking assembly.

As can be seen in FIG. 2, the internal configuration of storage compartment 46 can vary greatly depending upon the position assumed by the foldable rear storage platform indicated generally at 80. The rear storage platform 80 includes a rear platform section 82 and a front platform 84. The rear and front sections are connected together by a hinge 86 which permits the sections to fold over on top of each other. A hinge member 88 at the front end of front platform section 84 permits the storage platform 80 to be stored in a generally vertical position against the back of seat cushion 62, as shown in dotted lines, after the rear section 82 has been pivoted into contact with the front section 84 as shown in horizontal dotted lines. A bracket member 90 fastened to the vertical side walls 48 supports the platform section 84 in its horizontal position.

We claim:

1. A rear storage compartment for a van-type vehicle having windows in its rear doors comprising:
a plurality of vertical support portions mounted in said vehicle forwardly of said rear doors and extending in a forward direction to a height greater than the height of the bottom or the rear door windows; a top portion, spaced forwardly from said rear doors and windows and carried by said vertical support portions; generally vertically extending forward portions extending transversely between said vertical support portions, and rigid shield portions mounted on the inner side of said rear doors and configured so that the top of said shield portions extend into said vehicle and away from said windows to cooperate with said top portion when said rear doors are closed to define a substantially closed compartment and to prevent said compartment from being viewed through said windows from outside the vehicle.

2. A rear storage compartment in accordance with claim 1 wherein said top portion and said shield portions extend to a vertical height less than the height of the windows to permit an occupant of the vehicle to look out of the upper portion of the rear windows.

3. A rear storage compartment in accordance with claim 2 wherein said shield portions are mounted to said doors under said windows and extend vertically upwardly past a portion of said windows at a spaced distance therefrom so that an occupant of said vehicle may see out of any portion of said windows from a vantage point above said top portion.

4. A rear storage compartment in accordance with claim 1 wherein said storage compartment includes at least one storage section for hanging clothes.

5. A rear storage compartment in accordance with claim 4 wherein said storage section includes an access opening and closure means therefor accessible from interior portions of the van located forwardly of said storage compartment.

6. A rear storage compartment in accordance with claim 4 wherein lock means for said closure means are mounted in said storage section so that access to said storage section from the forward interior portion of said van can be prevented.

7. A rear storage compartment in accordance with claim 1 wherein one of said generally vertically extending forward portions comprises the rear surface of a back supporting cushion which forms the back portion of a seat located forwardly of said storage compartment, and lock means accessible only from said storage compartment for anchoring said back supporting cushion to another of said vertically extending forward portions.

* * * * *